United States Patent
Röthemeyer et al.

(10) Patent No.: US 6,494,980 B1
(45) Date of Patent: Dec. 17, 2002

(54) DEVICE FOR INCORPORATING INDIVIDUAL REINFORCING THREADS INTO AN UNFINISHED TUBE AND PROCESS FOR MANUFACTURING A THREAD-REINFORCED UNFINISHED TUBE WITH THE AID OF THIS DEVICE

(75) Inventors: Fritz Röthemeyer, Isernhagen (DE); Achim Hüls, Barsinghausen (DE); Rainer Oehl, Hannover (DE); Stefan Wode, Langenhagen (DE)

(73) Assignee: Contitech Luftfedersysteme GmbH, Hannover (DE)

( * ) Notice: Subject to any disclaimer, the term of this patent is extended or adjusted under 35 U.S.C. 154(b) by 0 days.

(21) Appl. No.: 09/414,891

(22) Filed: Oct. 8, 1999

(30) Foreign Application Priority Data

Oct. 12, 1998 (DE) .......................... 198 46 852

(51) Int. Cl.⁷ .............................. B65H 81/00
(52) U.S. Cl. ................. 156/169; 156/425; 156/428; 156/431; 242/439.5
(58) Field of Search ................. 156/169–175, 156/425, 428, 429, 430, 431; 242/439.5

(56) References Cited

U.S. PATENT DOCUMENTS 2,093,206 A   9/1937  Muller
3,032,461 A * 5/1962  Baker .......................... 156/432
3,736,210 A * 5/1973  Kaczerginski ............... 156/171
4,578,024 A   3/1986  Sicka et al. .................. 425/114

FOREIGN PATENT DOCUMENTS

| AU | 18277 76 | 4/1978 |
| DE | 3824757 | 2/1989 |
| EP | 0605767 | 7/1994 |
| EP | 0 605 767 | 7/1994 |
| FR | 1 113 671 | 4/1956 |
| FR | 1 126 040 | 11/1958 |
| FR | 2 512 577 | 3/1983 |

* cited by examiner

Primary Examiner—Michael W. Ball
Assistant Examiner—Justin Fischer
(74) Attorney, Agent, or Firm—Smith, Gambrell & Russell, LLP

(57) ABSTRACT

A device is disclosed for applying individual reinforcing threads onto a tubular layer. The device contains a positioning ring with equidistant holes that lie on a circumferential line, with the positioning ring surrounding and concentric with a rotationally symmetric, funnel-shaped deflection element. The deflection element deflects the reinforcing threads that are guided from radially outward to radially inward through the holes f the positioning ring into an essentially axial direction, wherein all the threads assume an equidistant spacing from one another. Also disclosed is a process for manufacturing an unfinished tube consisting of several layers with the aid of the device.

13 Claims, 5 Drawing Sheets

DEVICE FOR INCORPORATING INDIVIDUAL REINFORCING THREADS INTO AN UNFINISHED TUBE AND PROCESS FOR MANUFACTURING A THREAD-REINFORCED UNFINISHED TUBE WITH THE AID OF THIS DEVICE

INTRODUCTION AND BACKGROUND

The present invention pertains to a device for applying individual reinforcing threads onto a tubular layer made of polymer material that is additionally processed into a thread-reinforced unfinished tube made of polymer material consisting of several layers. The invention also pertains to a process for manufacturing a thread-reinforced unfinished tube made of polymer material that consists of several layers with the aid of such a device.

Tubes and diaphragm for air springs are typical products manufactured from a thread-reinforced polymer material. For example, the diaphragm of an air spring is subjected to high pressure. Such a diaphragm contains multiple reinforcing threads that are positioned close to one another with an equidistant spacing in order to withstand this pressure (a conventional diaphragm for an air spring contains, for example, approximately 200–300 reinforcing threads per 10 cm).

It has been known for a long time to manufacture a diaphragm for an air spring from individual plane layers, in which the reinforcing threads are already embedded. The individual layers are wound onto a mandrel and connected to one another within an overlapping region or a joint region, and then vulcanized. The diaphragm for the air spring is finished after this vulcanization.

The aforementioned process has the advantage that a large number of reinforcing threads spaced equidistant from each other can be easily embedded in a plane layer. However, it has been determined that the overlapping region or the joint region of the diaphragm may disadvantageously influence the physical properties of the diaphragm and also reduce the stability of the diaphragm within this region.

Therefore, it has already been proposed to manufacture a diaphragm for an air spring from an endless tube, into which the equidistant reinforcing threads are already incorporated. The advantage of this manufacturing process can be seen in the fact that the tube, from which the diaphragm is cut at the desired length, contains neither an overlapping region nor a joint region. However, it is relatively difficult to embed a large quantity of equidistant reinforcing threads into a tube. Different processes for realizing this feature have already been proposed.

One example of a coextrusion device for manufacturing a thread-reinforced unfinished tube made of polymer material is known from EP 0 605 767 A1. The unfinished tube consists of three layers, with two helically wound layers of equidistant reinforcing threads located between the first layer and the third layer. The two reinforcing thread layers are separated from one another by the second layer. The coextrusion device for manufacturing such an unfinished tube contains a first flow channel with circular cross section, which is concentrically surrounded by a second and a third flow channel with circular cross section. These flow channels are used to manufacture the individual polymer layers of the unfinished tube. A guide element for the first layer of reinforcing threads, which also has a circular cross section, is situated between the first and the second flow channel. One additional guide element for the second layer of reinforcing threads is situated between the second and the third flow channel. The guide elements for the reinforcing threads are arranged in a rotating fashion between the flow channels so as to make it possible to embed the reinforcing threads in a helical pattern between the individual layers of the unfinished tube. Each guide element contains a series of equidistant guide channels, with one reinforcing thread being guided in each guide channel. The flow channels and the guide elements have the shape of a cone and taper in the longitudinal direction to the diameter of the unfinished tube to be manufactured.

An unfinished tube that contains two layers of helically wound, equidistant reinforcing threads can be manufactured in one step with the coextrusion device known from EP 0 605 767 A1. However, a complicated preparation of the coextrusion device is required before the manufacture of the unfinished tube can begin because the reinforcing threads must be individually guided through the guide channels of the guide elements.

U.S. Pat. No. 4,578,024 pertains to a coextrusion device that has a design similar to the coextrusion device known from EP 0 605 767 A1. This device also makes it possible to manufacture an unfinished tube with equidistant reinforcing threads in one step. In this coextrusion device, each individual reinforcing thread is guided into an assigned guide channel, so that a complicated preparation of the coextrusion device is also required in this case before the manufacture of the unfinished tube can begin.

Accordingly, it is an object of the present invention to enable the applying of individual reinforcing threads onto a tubular layer made of polymer material to provide a simple manufacture of an unfinished tube with equidistant reinforcing threads and can be easily prepared for the manufacturing process.

Another object of the invention is to enable simple preparation and execution for the manufacturing of a thread-reinforced unfinished tube made of polymer material.

SUMMARY OF THE INVENTION

The above and other objects of the present invention can be achieved by a device for applying individual reinforcing threads onto a tubular layer of polymer material that can then be processed into a thread-reinforced unfinished tube of polymer material comprising a plurality of layers.

The device contains a positioning ring with at least one row of equidistant holes on a circumferential line, wherein the reinforcing threads are guided from radially outward to radially inward through the aforementioned holes at an inlet angle relative to the longitudinal axis of the positioning ring.

Further, the device contains a rotationally symmetric, funnel-shaped deflection element that surrounds one continuously tapering channel with an annular inlet surface and a smaller annular outlet surface, wherein the reinforcing threads are guided on the rotationally symmetric radially inner surface of said deflection element.

At the inlet surface, the deflection element has an inlet angle $\alpha$ relative to the longitudinal axis of the deflection element, which corresponds to a great extent to the inlet angle of the reinforcing threads relative to the longitudinal axis of the positioning ring.

At the outlet surface, the deflection element has an outlet angle $\beta$ relative to the longitudinal axis of the deflection element that lies between approximately 0° and 25°, preferably between 0° and 10°.

The deflection element is concentric with and surrounded by the positioning ring and axially aligned relative to the positioning ring in such a way that reinforcing threads that are radially guided through the holes of the positioning ring can be directly guided into the inlet surface of the deflection element.

It is a feature of the invention to achieve the above and other objects by a process wherein:

a reinforcing thread is guided from radially outward to radially inward through each hole of the positioning ring at an inlet angle relative to the longitudinal axis of the positioning ring, and the reinforcing threads are placed onto the radially inner surface of the deflection element and deflected by the inlet angle into a largely axial direction by the deflection element, with the reinforcing threads under constant tension, and with the following steps being carried out in order to manufacture a thread-reinforced unfinished tube:

a first layer of polymer material is applied onto a rotationally symmetric mandrel in a first processing station, the mandrel coated with the first layer is concentrically guided from the inlet surface of the deflection element through the outlet surface of the deflection element such that the reinforcing threads situated on the radially inner surface of the deflection element are deposited on the radially outer surface of the first layer with an equidistant spacing from one another, and the mandrel coated with the first layer is transferred to at least one additional processing station, in which another layer of polymer material is applied to the first layer.

BRIEF DESCRIPTION OF THE DRAWINGS

The present invention will be further understood with reference to the drawings, wherein.

DETAILED DESCRIPTION OF INVENTION

Figure 1A:
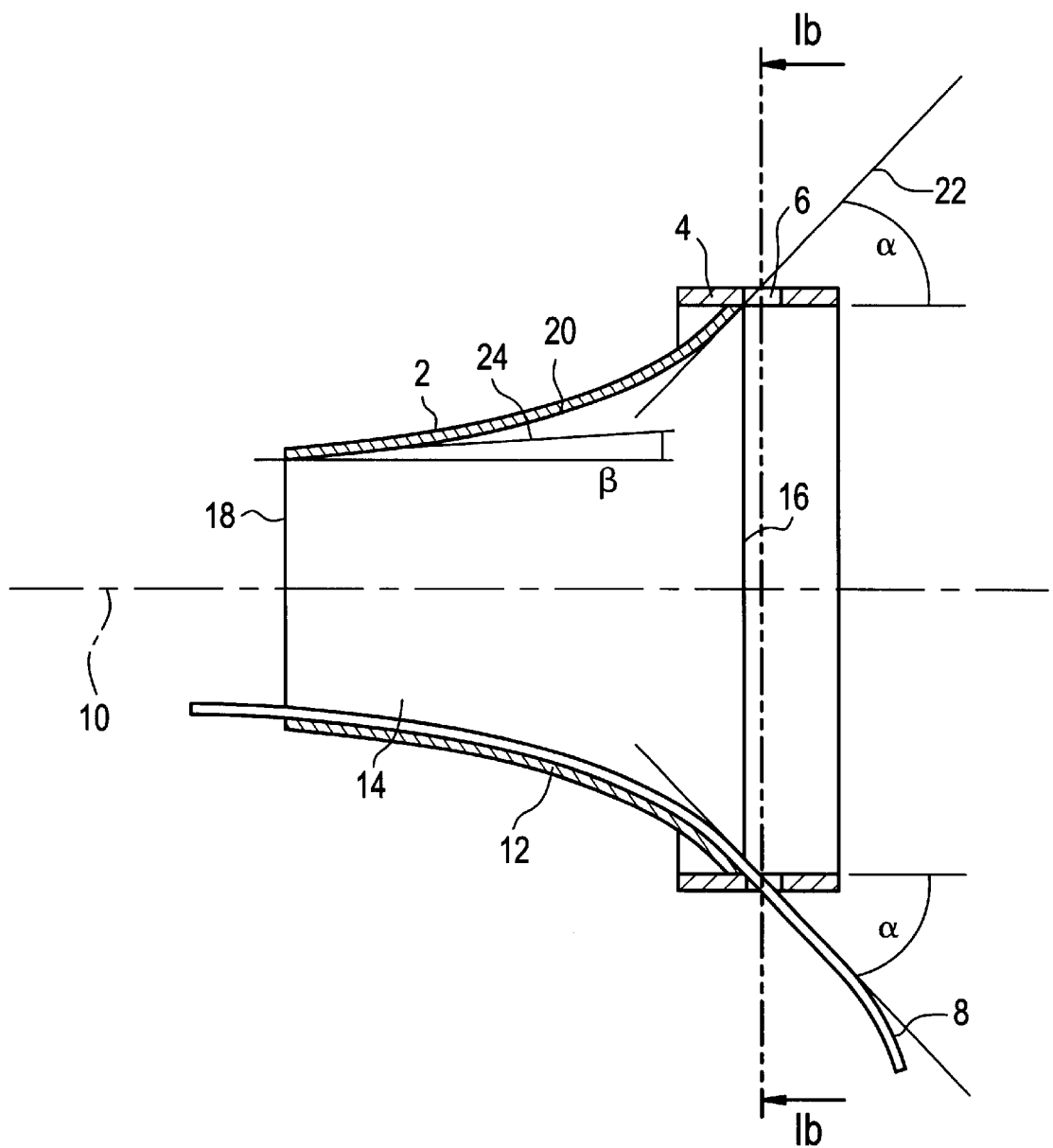
FIG. 1a, is a longitudinal section through a device of the present invention for applying individual reinforcing threads onto a tubular layer.

In carrying out the present invention, the reinforcing threads are guided individually through the holes of the positioning ring, while no guide channels for the individual reinforcing threads are provided in the deflection element. Each reinforcing thread is guided on the radially inner surface of the deflection element without a separate guide channel. If each of the reinforcing threads is subjected to tension during this process, the reinforcing threads are automatically placed on the radially inner surface of the deflection element in such a way that they all assume the desired equidistant spacing from one another in the annular outlet surface of the deflection element.

The advantages attained with the invention can, in particular, be seen in the fact that the individual reinforcing threads can be easily guided through the individual holes in the positioning ring because the individual holes do not consist of elongated guide channels.

Another advantage of the invention can be seen in the fact that the individual reinforcing threads are automatically placed in the desired pattern on the radially inner surface of the deflection element if the reinforcing threads are subjected to tension in the longitudinal direction of the deflection element. Consequently, elongated guide channels, in which the individual reinforcing threads are guided, can be completely eliminated in the deflection element, and the device can be easily prepared for the manufacturing process.

Another advantage of the invention can be seen in the fact that the individual reinforcing threads are freely accessible in the deflection element and, among other things, can be easily monitored.

According to one additional development of the invention, the reinforcing threads are guided through the positioning ring at an inlet angle that is between approximately 40° and 100°, preferably between 80° and 90°, relative to the longitudinal axis of the positioning ring. Accordingly, the deflection element also has an inlet angle $\alpha$ that is between 40° and 100°, preferably between 80° and 90°, relative to the longitudinal axis of the deflection element at the inlet opening. The advantage of this additional development can be seen in the fact that the individual reinforcing threads can be guided nearly perpendicular to the longitudinal axis of the positioning ring radially outside of the positioning ring (which corresponds to an inlet angle of 90°). Consequently, a spool rack with a series of spools, from which the individual reinforcing threads are unwound, can be aligned perpendicular to the longitudinal axis of the positioning ring such that the entire device, including the spool rack, for applying the individual reinforcing threads only requires a small length.

According to the additional development of the invention, the radially inner surface of the deflection element corresponds to a great extent to the surface generated during the rotation of a quarter circle or a quarter ellipse about the longitudinal axis of the positioning ring. The advantage of this additional development can be seen in the fact that the individual reinforcing threads can be deflected over an extremely short distance from an inlet angle that is between 80° and 90° relative to the longitudinal axis of the positioning ring to an outlet angle that is between 0° and 15° relative to the longitudinal axis of the positioning ring.

According to the additional development of the process, the first layer is provided with an adhesive layer, e.g., in the form of a rubber solution, on its radially outer surface before the reinforcing threads are applied. This additional development is used particularly when the individual reinforcing threads are deposited parallel to the longitudinal direction of the first layer on the radially outer surface of this layer because in this case, there are no circumferential forces for embedding the threads. The individual reinforcing threads are "bonded" to the radially outer surface of the first layer by the rubber solution such that the individual reinforcing threads are reliably held in their respective positions.

According to the additional development of the process, the positioning ring and the deflection element rotate about their longitudinal axis with the same angular velocity such that the reinforcing threads are deposited on the radially outer surface of the first layer in a spiral shape. In this additional development, the mandrel only moves translationally through the outlet surface of the deflection element from the inlet surface so that an unfinished tube with a layer of reinforcing threads that extend in a spiral-shaped pattern can be manufactured with this additional development. In this case, it is not absolutely imperative to provide the radially outer surface of the first layer with an adhesive layer before depositing the reinforcing threads because there is a force that is directed radially inward and automatically fixes each individual reinforcing thread in its position due to the spiral-shaped deposition of the individual reinforcing threads.

According to the additional development of the invention, the first layer is covered with an intermediate layer on its radially outer surface in a processing station after the reinforcing threads are deposited on this first layer, with additional reinforcing threads being deposited on this intermediate layer analogous to the process described previously. The advantage of this additional development can be seen in the fact that an unfinished tube can be manufactured with two reinforcing layers of individual equidistant reinforcing threads that are separated from one another by a polymer layer.

According to the additional development of the invention, the positioning ring and the deflection element of the first device and the additional device rotate around about their longitudinal axis with an angular velocity such that the reinforcing threads are deposited on the radially outer surface of the first layer or the intermediate layer in a spiral-shaped pattern. In this case, the rotating direction of the positioning ring and the deflection element of the additional device is opposite to the rotating direction of the positioning ring and the deflection element of the first device, and the angular velocities, with which the two devices are rotating, are preferably almost equal to one another. The angular velocity can be calculated with the relation $n = v/2\pi D \tan \delta$. In this case, n is the rotational speed of the deflection device, v is the axial velocity of the mandrel, D is the outside diameter of the unfinished tube, around which the reinforcing threads must be wound, and $\delta$ is the thread angle relative to the circumferential direction of the mandrel. The advantage of this additional development can be seen in the fact that the first and the second device can easily manufacture an unfinished tube that contains two layers of individual equidistant reinforcing threads that are wound in a spiral-shaped pattern and that are separated from one another by an intermediate layer.

According to the additional development of the process, the radius of the mandrel corresponds to a great extent to the radius of the outlet surface of the first deflection device or, if available, the second deflection device. The wording "corresponds to a great extent to the radius of the outlet surface" should be understood to mean that a layer applied to the mandrel can be guided through the outlet surface of the deflection element at a minimal distance without contacting the radially inner surface of the deflection element in the outlet surface. The advantage of this additional development can be seen in the fact that the individual reinforcing threads are guided exactly in the axial direction between the mandrel and the radially inner surface of the outlet surface, so that a particularly exact deposition on the radially outer surface of the layer is possible on the mandrel.

According to the additional development of the process, the tension acting upon the individual reinforcing threads corresponds to 0.5 N–5 N, preferably 0.6 N–1 N/thread. It was determined that such a tension suffices for ensuring that the individual reinforcing threads are exactly placed on the radially inner surface of the deflection element. The advantage of this additional development can be seen in the fact that the total tension that acts upon all reinforcing threads and must be generated by the translational movement of the mandrel is relatively low.

FIG. 1a shows a longitudinal section through a device 2 for applying individual reinforcing threads onto a tubular layer. The device 2 contains a circular positioning ring 4 with a row of equidistant holes 6 on a circumferential line (see also FIG. 1b, which shows a cross section along the line Ib—Ib in FIG. 1a). One reinforcing thread 8 is guided radially inward through each hole 6 at an inlet angle â relative to the longitudinal axis 10 of the positioning ring 4. Each individual reinforcing thread 8 is unwound from a spool that is situated radially outside the positioning ring 4, with the respective spools being mounted on a spool rack that surrounds and is concentric with the positioning ring 4. The spools and the spool rack are not shown in FIG. 1a, but are referred to in FIG. 4.

In addition to the positioning ring 4, the device 2 contains a rotationally symmetric, funnel-shaped deflection element 12. This deflection element contains a single continuously tapering channel 14 with an annular inlet opening 16 and a smaller annular outlet opening 18. The diameter of the inlet opening 16 corresponds to the inside diameter of the positioning ring. The individual reinforcing threads 8 are guided on the radially inner surface 20 of the deflection element 12. This is described in greater detail below with reference to the figures.

At the inlet opening 16, a tangent 22 that is drawn in the longitudinal direction on the radially inner surface 20 has an inlet angle $\alpha$ relative to the longitudinal axis 10 of the deflection element 12. The inlet angle $\alpha$ corresponds to the inlet angle $\alpha$ to the longitudinal axis 10 of the positioning ring 4 and lies between 40° and 100°, preferably between 80° and 90°.

At the outlet opening 418, a tangent 24 drawn in the longitudinal direction on the radially inner surface 20 has an outlet angle $\beta$ relative to the longitudinal axis 10 of the deflection element 12 that lies between 0° and 25°, preferably between 0° and 10°.

The deflection element 12 is concentrically surrounded by the positioning ring 4 such that the longitudinal axis 10 of the deflection element 12 coincides with the longitudinal axis 10 of the positioning ring 4. In addition, the deflection element 12 is axially aligned relative to the positioning ring 4 in such a way that the holes 6 of the positioning ring 4 lie directly in front of the inlet opening 16 of the deflection element 12, so that reinforcing threads 8 that are guided radially inward through the holes 6 can be directly guided into the inlet opening 16 of the deflection element 12. A reinforcing thread 8 that is guided on the radially inner surface and that assumes the angle $\beta$ relative to the longitudinal axis 10 radially outside of the positioning ring 4 is deflected by the deflection element 12 in such a way that it assumes an angle â relative to the longitudinal axis 10 at the outlet opening 18.

Figure 1B:
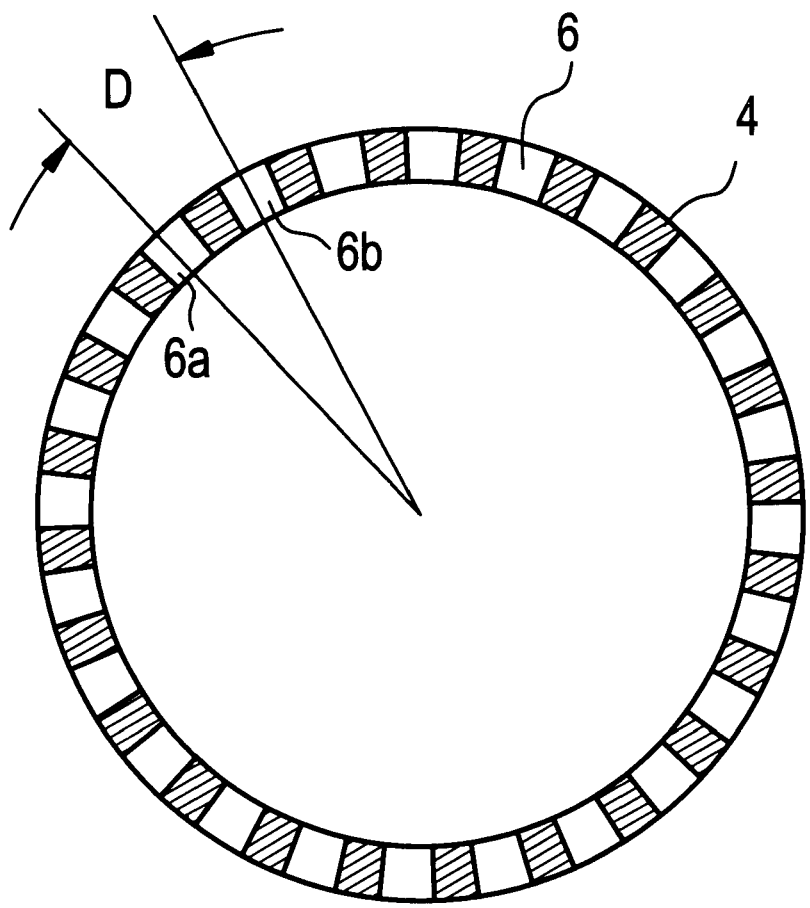
FIG. 1b, is a cross section through a device of the present invention for applying individual reinforcing threads onto a tubular layer.

FIG. 1b shows a section along the line Ib—Ib in FIG. 1a. A series of holes 6 are arranged on a circumferential line of the positioning ring 4. Two adjacent holes 6a and 6b in the positioning ring 4 are each spaced apart by the same distance D. One reinforcing thread 8 is guided through each hole 6 onto the radially inner surface 20 of the deflection element 12 as described previously with reference to FIG. 1a.

Figure 2:
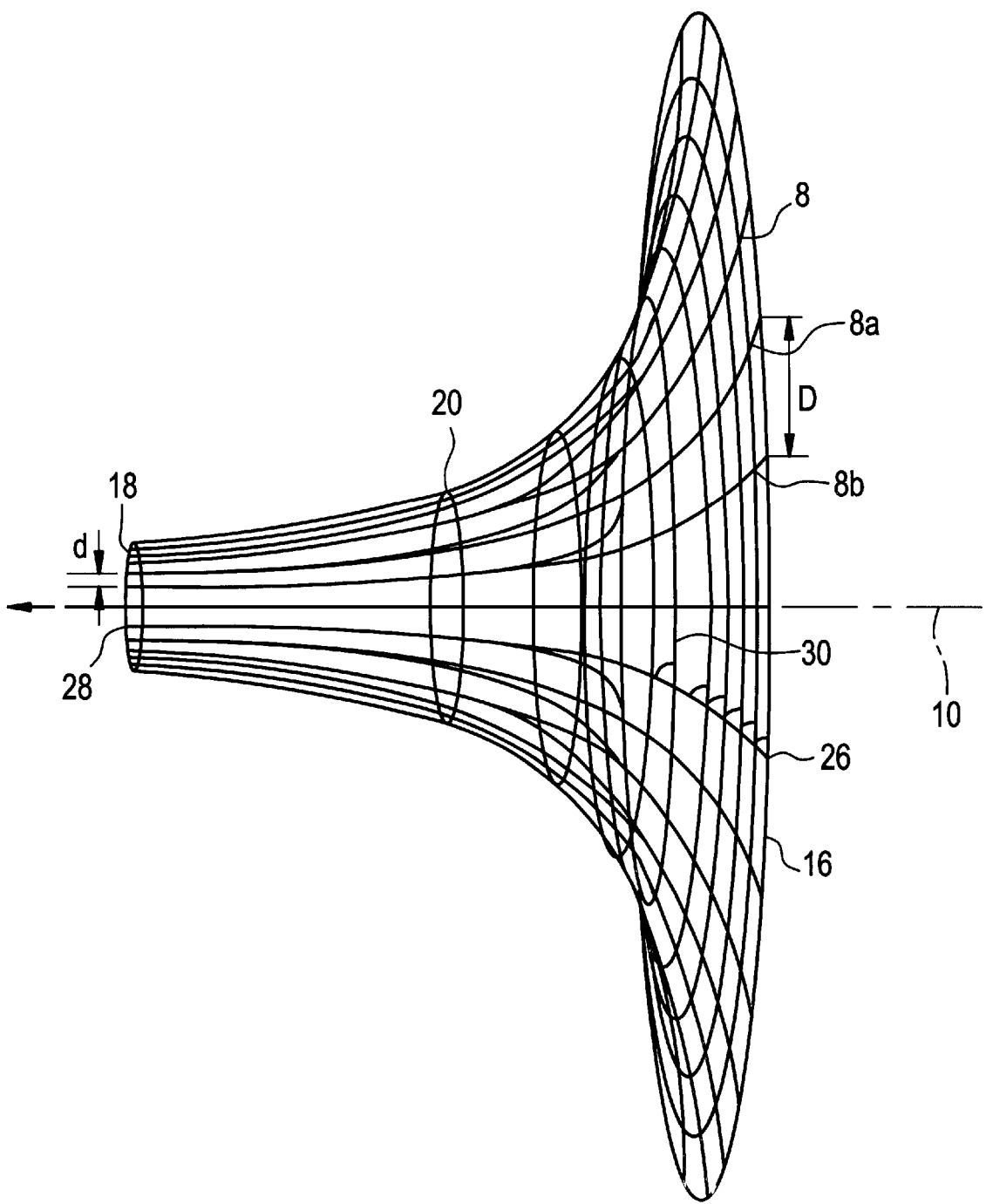
FIG. 2, is a schematic representation of a rotationally symmetric, funnel-shaped deflection element.

FIG. 2 shows the radially inner surface 20 of the deflection element 12 in the form of a perspective representation. The radially inner surface 20 is realized so that it is rotationally symmetric to the longitudinal axis 10 and has the shape of a funnel. Reinforcing threads 8 extend over the radially inner surface 20. In the inlet opening 16, two adjacent reinforcing threads 8a and 8b are spaced apart by the distance D that is defined by the distance between the holes 6 in the positioning ring 4. At the outlet opening 18, two adjacent reinforcing threads 8a, 8b are spaced apart by the distance d. This means that all reinforcing threads 8 are spaced apart equidistant in the inlet opening 16 as well as in the outlet opening 18. In this case, the ratio D/d is identical to the ratio R/r, where R corresponds to the radius of the inlet opening 16 and r corresponds to the radius of the outlet opening 16. Consequently, d=Dr/R. Due to the funnel-shaped deflection element 12, the individual reinforcing threads 8, which are spaced apart equidistantly by D in the inlet opening 16, converge such that they are spaced apart equidistantly by a smaller distance. The "degree of convergence" is defined by the ratio r/R.

The following explains how the previously described orientation of the reinforcing threads 8 on the radially inner surface 20 is achieved. If the reinforcing threads 8 are guided from the inlet opening 16 to the outlet opening 18 on the radially inner surface of the deflection element 12 and subjected to tension during this process, the reinforcing threads 8 are placed on the radially inner surface 20 of the deflection element 12. Due to the tension that acts upon each individual reinforcing thread 8 in the longitudinal direction of the deflection element 12 (as indicated by the arrow in FIG. 2), this automatically takes place in such a way that each reinforcing thread extends from a point 26 in the inlet opening 16 to a point 28 in the outlet opening 18 over the shortest possible distance. This shortest connecting line, along which a reinforcing thread 8 extends, is essentially defined by the fact that the reinforcing thread 8 extends perpendicularly on each imaginary circular circumferential line 30 of the radially inner surface 20. Consequently, the reinforcing threads 8 that extend from the inlet opening 16 to the outlet opening 18 converge, however, they assume an equidistant spacing from one another in any imaginary circular circumferential line 30. Otherwise, there would exist at least one imaginary circular circumferential line 30, on which not all reinforcing threads 8 would extend perpendicularly. The reinforcing threads 8 assume, in particular, an equidistant spacing from one another in the outlet opening 18.

The funnel-shaped, rotationally symmetric radially inner surface 20 of the deflection element 12 causes the reinforcing threads to be deflected as described previously with reference to FIG. 1. In addition, the radially inner surface 20 causes the distance D between two adjacent reinforcing threads in the inlet opening 16 to be reduced to the distance d between two adjacent reinforcing threads in the outlet opening 18. This is realized without requiring even one guide channel for the individual reinforcing threads on the radially inner surface 20. The only condition to be fulfilled consists of exerting tension upon the reinforcing threads 8 in the longitudinal direction of the deflection element 12. In addition, the frictional forces between the reinforcing threads and the radially inner surface 20 should be as low as possible so as to allow a simple alignment of the threads.

Figure 3:
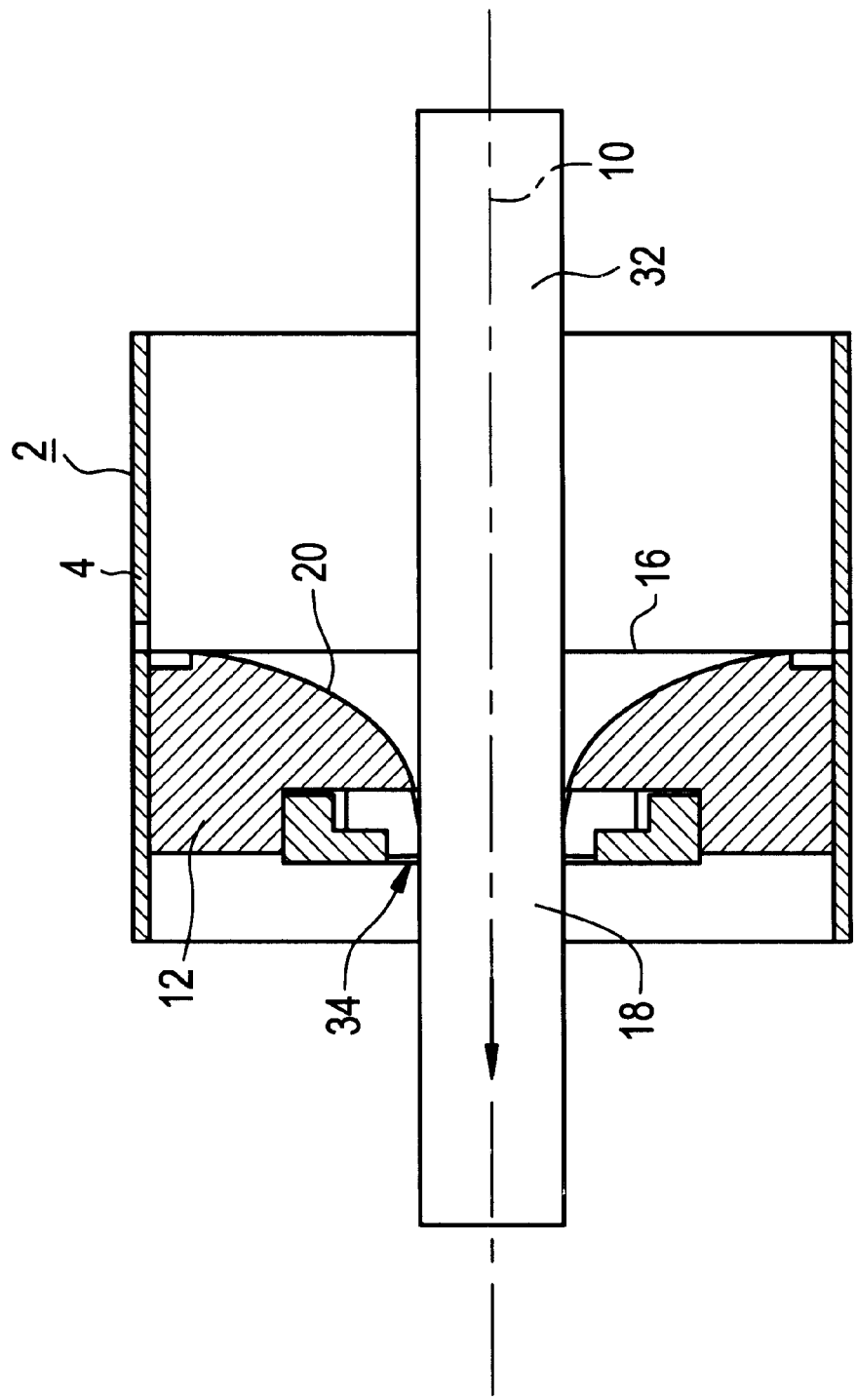
FIG. 3, is a longitudinal section through a device of the present invention for applying individual reinforcing threads onto a tubular layer.

FIG. 3 shows a longitudinal section through a device 2 for applying individual reinforcing threads onto a tubular layer, with said device containing a circular positioning ring 4 and a rotationally symmetric deflection element. The device is, in principle, designed exactly like the previous description for FIG. 1, so this description will be referred to in this respect. In the device 2 shown in FIG. 3, the radially inner surface 20 of the deflection element 12 corresponds to a great extent to the surface generated during the rotation of a quarter circle (or a quarter ellipse) about the longitudinal axis 10 of the positioning ring 4. In the embodiment shown in FIG. 3, the individual reinforcing threads 8 are guided radially inward at an inlet angle relative to the longitudinal axis 10 of the positioning ring 4, with said angle lying between 80° and 100°, preferably between 80° and 90°. The deflection element 12 deflects the individual reinforcing threads in such a way that they assume an outlet angle that is between 0° and 10° on the outlet surface of the deflection element 12. A deflection over such a large angular range can be carried out over a very short distance with the deflection element 12 shown in FIG. 3.

A mandrel 32 is concentrically guided through the radial interior of the deflection element 12 from the inlet opening 16 (the moving direction of the mandrel 32 is indicated by an arrow). The diameter of the mandrel 32 corresponds to a great extent to the diameter of the outlet opening 18 of the deflection element 12. Within the region of the outlet opening 18, the deflection element 12 contains an elastic, rotationally symmetric centering collar 34, whose radially inner surface is flush with the radially inner surface 20 of the deflection element 12. The centering collar 34 makes it possible to also guide the mandrel 32 through the radial interior of the deflection element 12 if the mandrel is covered with a thin tubular layer of polymer material. In this case, the elastic centering collar is pressed radially outward by the thickness of the tubular layer, and the reinforcing threads are deposited on the radially outer surface of the tubular layer.

Figure 4:
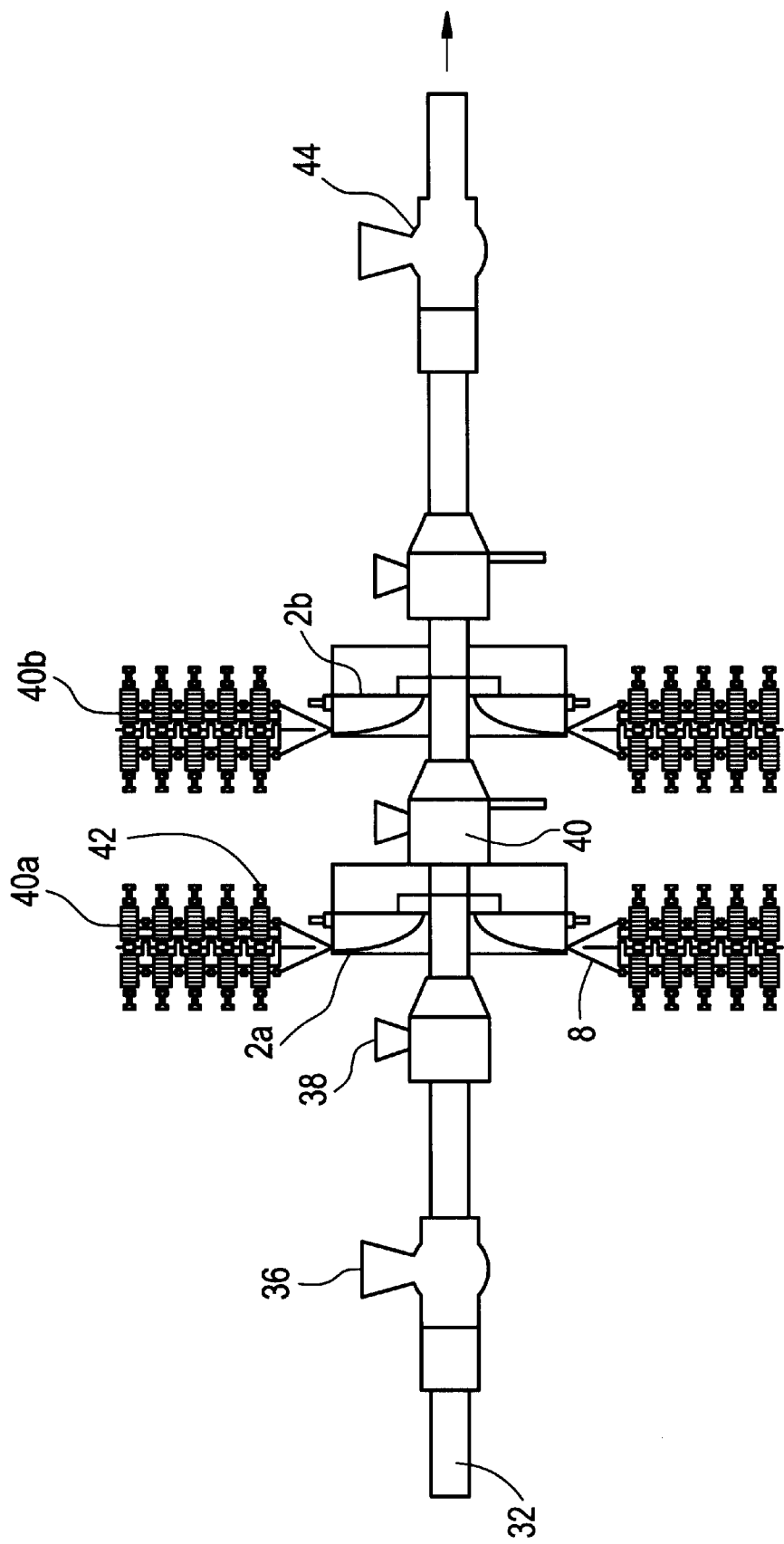
FIG. 4, is a schematic representation of a production line for manufacturing a thread-reinforced unfinished tube that consists of several layers.

FIG. 4 shows a schematic longitudinal section through a production line for manufacturing a thread-reinforced unfinished tube that consists of several layers. The mandrel 32 is guided through the individual processing stations from the left to the right in the direction of the arrow. A first tubular layer of polymer material is applied to the mandrel 32 with the aid of a first extruder 36. An adhesive layer is applied to the radially outer surface of the first tubular layer in a processing station 38. Subsequently, the mandrel 32 is guided through a first device 2a for applying individual reinforcing threads 8. The device 2a is designed analogous to the previous description for FIG. 3. The mandrel 32 is also guided through the device 2a analogous to the previous description for FIG. 3. The device 2a deflects the reinforcing threads 8, which are unwound from a spool rack 40a that is concentric with and surrounds the device 2a and which are deposited on the radially outer surface of the first layer with an equidistant spacing from one another.

In order to produce a constant tension in the longitudinal direction of the mandrel 32 on the reinforcing threads that lie on the radially inner surface of the device 2 by means of a translational movement of the mandrel, each spool 42 of the spool rack 40a is provided with a brake. The brake serves for adjusting the tension acting upon each individual reinforcing thread, where the tension is between 5 N and 50 N, preferably between 0.6 N and 1 N per reinforcing thread.

After the reinforcing threads are deposited on the radially outer surface of the first layer of the unfinished tube in the first device 2a, the layer of reinforcing threads is covered with an intermediate layer in another processing station 40a. The intermediate layer may consist of another layer of polymer material or an adhesive layer.

A second layer of reinforcing threads is then deposited onto the radially outer surface of the intermediate layer in the device 2b. This is carried out analogous to the deposition of the reinforcing threads on the radially outer surface of the first layer that was described above.

Subsequently, the mandrel 32 is guided through a second extruder 44, in which the radially outer surface of the intermediate layer is covered with another layer of polymer material. After this process, the unfinished tube is finished and can be additionally processed in conventional fashion.

The first device 2a and the corresponding first spool rack 40a are able to rotate about the longitudinal axis of the mandrel with a certain corresponding angular velocity. In this case, the reinforcing threads are deposited on the radially outer surface of the first layer in a spiral-shaped pattern. Accordingly, the second device 2b and the corresponding spool rack 40b are also able to rotate about the longitudinal axis of the mandrel 32 with a certain corresponding angular velocity. In this case, the reinforcing threads are also deposited on the intermediate layer in a spiral-shaped pattern. The angular velocities of the devices 2a and 2b and the spool racks 40a and 40b preferably correspond, with the rotating direction of the devices 2a and 2b and the spool racks 40a and 40b being opposite. In this case, the helix angle of both spirals is identical, but their rotating directions are opposite.

Further variations and modifications of the foregoing will be apparent to those skilled in the art and are intended to be encompassed by the claims appended hereto.

German priority application 198 46 852.0 filed Oct. 12, 1998 is relied on and incorporated herein by reference.

We claim:

1. A device for applying a plurality of individual reinforcing threads onto a tubular layer of polymer material that is additionally processed into a thread-reinforced unfinished tube of polymer material of a plurality of layers, said device comprising a positioning ring with at least one row of equidistant holes on a circumferential line, whereby a reinforcing thread is guided from radially outward to radially inward through each hole at an inlet angle relative to the longitudinal axis of the positioning ring,
   a rotationally symmetric, funnel-shaped deflection element forming one continuously tapering channel with an annular inlet opening and a smaller annular outlet opening, whereby the reinforcing threads are guided on the radially inner surface of said deflection element,
   at the annular inlet opening, the deflection element has an inlet angle α relative to the longitudinal axis of the deflection element, which essentially corresponds to the annular inlet angle of the reinforcing threads relative to a longitudinal axis of the positioning ring, said inlet angle being defined by the intersection of the positioning ring and the annular inlet opening
   at the annular outlet opening, the deflection element has an outlet angle β relative to a longitudinal axis of the deflection element that lies between 0° and 25°, and
   the deflection element is concentric with and surrounded by the positioning ring at its annular inlet opening and axially aligned relative to the positioning ring and in contact with said positioning ring in such a way that reinforcing threads that are radially guided through the holes of the positioning ring can be directly guided into the inlet opening of the deflection element.

2. The device according to claim 1, wherein the outlet angle is between 0° and 10°.

3. The device according to claim 1, wherein the reinforcing threads are guided through the holes of the positioning ring at an inlet angle relative to the longitudinal axis of the positioning ring, wherein said inlet angle is between 40° and 100°.

4. The device according to claim 3, wherein the inlet angle is 80° to 90°.

5. The device according to claim 2, wherein the radially inner surface of the deflection element essentially corresponds to the surface generated during the rotation of a quarter circle or a quarter ellipse about the longitudinal axis of the positioning ring.

6. A process for manufacturing a thread-reinforced unfinished tube of polymer material of a plurality of layers by means of a device according to claim 1 comprising:
   in a first processing station, applying a first layer of polymer material onto a rotationally symmetric mandrel,
   guiding one reinforcing thread from radially outward to radially inward through each hole of a positioning ring at an inlet angle relative to a longitudinal axis of the positioning ring,
   placing the reinforcing threads onto a radially inner surface of the deflection element and deflecting by the inlet angle into a largely axial direction by the deflection element, with the reinforcing threads under constant tension,
   depositing said reinforcing threads onto said mandrel,
   guiding the mandrel coated with the first layer of reinforcing threads concentrically through the outlet opening of the deflection element from the inlet opening of the deflection element such that the reinforcing threads situated on a radially inner surface of the deflection element are deposited on the radially outer surface of the first layer with an equidistant spacing from one another, and
   transferring the mandrel coated with the first layer to at least one other processing station, in which another layer of polymer material is applied to the first layer.

7. The process according to claim 6, wherein the first layer of polymer material is provided with an adhesive layer, before the reinforcing threads are deposited on the radially outer surface.

8. The process according to claim 7 wherein the adhesive layer is a rubber solution.

9. The process according to claim 6, wherein the positioning ring and the deflection element are rotated about their longitudinal axis with the same angular velocity such that the reinforcing threads are deposited on the radially outer surface of the first layer in a spiral-shaped pattern.

10. The process according to claim 7, further comprising covering the first layer of polymer material with an intermediate layer on its radially outer surface in a processing station after the reinforcing threads are deposited on the first layer of polymer material, and depositing additional reinforcing threads on this intermediate layer by means of one additional deflection device,
   guiding one reinforcing thread from radially outward to radially inward through each hole of the positioning ring of an additional device at an inlet angle relative to the longitudinal axis of the positioning ring,
   placing the reinforcing threads on the radially inner surface of the deflection element of the additional device and deflected by the inlet angle into an essentially axial direction by the deflection element, with the reinforcing threads under constant tension, and
   guiding the mandrel coated with the first layer of polymer material and the intermediate layer concentrically through the outlet opening of the deflection element from the inlet opening of the deflection element such that the reinforcing threads situated on the radially inner surface of the deflection element are deposited on the radially outer surface of the intermediate layer with an equidistant spacing from one another.

11. The process according to claim 10, further comprising rotating the positioning ring and the deflection element of the first device and the second device about their longitudinal axis with an angular velocity such that the reinforcing threads are deposited on the radially outer surface of the first layer of polymer material or the intermediate layer in a spiral-shaped pattern, wherein the rotating direction of the positioning ring and the deflection element of the second device are opposite the rotating direction of the positioning ring and the deflection element of the first device, and with the angular velocities with which the two devices rotate preferably equal to one another.

12. The process according to claim 11 wherein the radius of the mandrel essentially corresponds to the radius of the outlet opening of the first deflection device or, a the second deflection device.

13. The process according to claim 6 wherein the tension acting upon each reinforcing thread is between 0.5 Nm and 5 Nm.

* * * * *